United States Patent
Sakomura et al.

[15] 3,669,944
[45] June 13, 1972

[54] PROCESS FOR PRODUCING CHLOROPRENE COPOLYMER

[72] Inventors: Toshio Sakomura; Akihiko Shimizu; Takayuki Kino; Atsushi Kita, all of Yamaguchi, Japan

[73] Assignee: Toyo Soda Manufacturing Co., Ltd., Nanyo-cho, Tsuno-gun, Yamaguchi, Japan

[22] Filed: Aug. 14, 1970

[21] Appl. No.: 63,943

[30] Foreign Application Priority Data

Aug. 14, 1969 Japan....................................44/64306

[52] U.S. Cl. .....................260/82.1, 260/80.7, 260/85.5 XA, 260/87.5 R
[51] Int. Cl......................C08d 1/09, C08d 3/14, C08d 3/02
[58] Field of Search.............260/82.1, 80.7, 85.5 XA, 87.5 R

[56] References Cited

UNITED STATES PATENTS

| | | | |
|---|---|---|---|
| 2,605,242 | 7/1952 | Betts et al. | 260/8 |
| 2,626,252 | 1/1953 | Tawney | 260/78.5 |
| 3,058,926 | 10/1962 | Eichorn | 260/2.5 |
| 3,058,929 | 10/1962 | Vanderhoff et al. | 260/2.5 |
| 3,481,895 | 12/1969 | Naarmann et al. | 260/29.7 |
| 3,506,636 | 4/1970 | Sturt | 260/92.3 |
| 3,562,192 | 2/1971 | Conard | 260/3.5 |

Primary Examiner—Joseph L. Schofer
Assistant Examiner—Richard A. Gaither
Attorney—Sughrue, Rothwell, Mion, Zinn and Macpeak

[57] ABSTRACT

A process for producing a chloroprene copolymer which comprises copolymerizing chloroprene with acrylonitrile as at least one component and another monomer which can be easily copolymerized with chloroprene in the presence of a halogenated aliphatic hydrocarbon having at least one bromine bond, with a free radical initiator.

6 Claims, No Drawings

PROCESS FOR PRODUCING CHLOROPRENE COPOLYMER

BACKGROUND OF THE INVENTION

1. Field of the Invention

The present invention relates to an improved molecular weight modifier for a chloroprene copolymer which has acrylonitrile as one component thereof.

2. Description of the Prior Art

Generally, in preparing chloroprene rubber, a modifier is employed such as n-mercaptanes; however, in the preparation of chloroprene copolymers containing acrylonitrile, n-mercaptane cannot be employed as the modifier because it readily reacts with the acrylonitrile.

Other known modifiers for the copolymerization of chloroprene with acrylonitrile are azothioether, t-mercaptane and disulphides. However, disulphides give rise to a sulphide smell. bond in the rubber and, consequently, the molecular weight of the rubber changes over a period of time during storage, and also, the vulcanization rate of the rubber is slow when unreacted disulphides remain. Since t-mercaptane, unlike n-mercaptane, does not readily react with acrylonitrile, it can be employed as a modifier, but in order to assure a desirable polymerization, a very large quantity is required, and the unreacted modifier in the rubber gives off an offensive smell.

The present inventors have found that halogenated aliphatic hydrocarbons having at least one bromine bond are satisfactory as a modifier for chloroprene-acrylonitrile copolymers.

The present invention provides a method for the production of a chloroprene copolymer with acrylonitrile or another monomer which can easily be copolymerized with the chloroprene, wherein the copolymerization is carried out in the presence of from 0.10 to 20.0 percent, by weight, of a halogenated aliphatic hydrocarbon having at least one bromine bond and with a free radical initiator.

DETAILED DESCRIPTION OF THE PREFERRED EMBODIMENTS

The chloroprene copolymers of the present invention comprise chloroprene and acrylonitrile and, in addition, contain a monomer component which can be easily copolymerized with the chloroprene; these monomers include, for example, dienes such as 1-chlorobutadiene, 2,3-dichlorobutadiene, butadiene and isoprene; styrene and acrylic acid esters. These monomers can be employed singly or in combination up to 20 percent, by weight, of the copolymer.

The polymerization modifier used in the present invention comprises a halogenated aliphatic hydrocarbon having at least one bromine bond; for example, carbon tetrabromide, bromotrichloromethane, bromo-trichloroethane, dibromo-dichloromethane, 1,1,1-tribromoethane, 1,1,2,2-tetrabromoethane, etc.; among these bromo-trichloromethane is especially preferable. The modifier can be employed in the range of 0.10 to 20.0 percent, by weight.

A quantity of modifier under 0.10 percent, by weight, is not sufficient to develop the proper activity, and in a quantity over 20.0 percent, by weight, no increase in activity is preferable, so that this amount is economically and quantitatively undesirable.

As the free radical initiators, any free radical initiator which is used in chloroprene homopolymerization and chloroprene copolymerization can be employed for example, potassium persulphate.

The polymerization process of the present invention is carried out in the presence of an emulsifier, for example, the alkaline salt of rosin soap by itself or together with a supplementary emulsifier like sodium naphthalene sulphonate-formaldehyde condensation product. In other words, the present process is an aqueous emulsion polymerization. Other emulsifiers which are generally employed in aqueous emulsion polymerization processes can be used in the present invention.

The polymerization can be effected at temperatures of 10° to 100° C. and preferably, 40° to 70° C.

In the polymerization process, generally, when the conversion has reached 50 to 80 percent, the reaction is stopped by adding a short stopping agent, e.g., para-tertiary-butyl catechol and phenothiazine. Ordinary stabilizers can be employed for the purpose of stabilizing the produced polymer.

The remaining monomer can be, for example, removed by treating at elevated temperature and under reduced pressure. The latex thus obtained may be used as is, or it may be coagulated, washed and dried.

The rubber which is obtained in accordance with the present invention has the following characteristics:

1. Copolymers obtained in accordance with the process of the present invention have a higher stability against heat than those produced by using well-known sulphur-containing modifiers.

2. Copolymers obtained in accordance with the process of the present invention have a higher rate of vulcanization than those produced by using well-known sulphur-containing modifiers.

The following examples further illustrate the present invention and are merely illustrative and not limiting in nature. Unless otherwise specified, all parts are by weight.

EXAMPLE 1

A polymerization process was carried out in a stainless steel vessel of 5 liter capacity equipped with a stirrer and a jacket. Into an atmosphere of nitrogen were added 106 parts of water, 5 parts of disproportionated rosin soap as an emulsifier, 0.5 part of the condensation product of formaldehyde-naphthalene sulphonate of sodium as a dispersion agent. In addition, 0.4 part of caustic soda and 0.3 part of sodium suphite were added, 95 parts of chloroprene, 2.5 parts of styrene and 2.5 parts of acrylonitrile together with 0.395 part of bromo-trichloromethane as a modifier were added under stirring. When the temperature of the system reached 50° C., 0.01 part of potassium persulphate as an initiator was continuously added, and when the conversion reached 70 percent, para-tertiary butyl catechol and phenothiazine were added to stop the reaction.

After adding the short stopping agent, unreacted monomer was recovered by distillation under reduced pressure, and the latex was solidified by freezing and then washed with water and dried in hot air. The rubber was dispersed in benzene; the viscosity average molecular weight as determined by the following formula at 40° C. was 310,000:

$$[\eta] = 1.55 \times 10^{-4} M\eta^{0.71}$$

(all molecular weights given hereinafter were calculated by the above formula)

In Table 1, results of physical property tests on the rubber produced above in comparison with those of conventional rubber are shown. As is evident from the table, the rubber produced above had a shorter scorch time than that produced with a known sulfur-containing modifier and accordingly, its stability against heat was superior.

TABLE 1

| | Example 1 | Articles from the market | | |
|---|---|---|---|---|
| Molecular weight | 330,000 | 320,000 | | |
| Scorch time: | | | | |
| t5 | 6 min. 22 sec. | 7 min. 56 sec. | | |
| t10 | 7 min. 20 sec. | 9 min. 18 sec. | | |
| t30 | 9 min. 25 sec. | 13 min. 25 sec. | | |
| Tensile test: | | | | |
| Vulcanization time (min) | 20 | 30 | 20 | 30 |
| M$_{300}$ (kg/cm²) | 104 | 113 | 96 | 116 |
| Tensile strength (kg/cm²) | 214 | 204 | 209 | 208 |
| Elongation (percent) | 470 | 440 | 530 | 440 |
| Hardness* (JIS) | 62/60 | 62/60 | 61/57 | 62/58 |

Table I—Continued

| Change in aging test: | | | | |
|---|---|---|---|---|
| Vulcanication time (min) | 20 | 30 | 20 | 30 |
| M₃₀₀ (percent) | 35 | 53 | 54 | 27 |
| Tensile strength (percent) | −8 | −3 | −6 | −2 |
| Elongation (percent) | −16 | −9 | −28 | −14 |
| Hardness (percent) | 4 | 4 | 8 | 7 |

* Immediately and after 30 second point. (the above results are expressed in accordance with JIS Specification)

EXAMPLE 2

Instead of bromo-trichloromethane as in Example 1, 20.0 parts of carbon tetrabromide was employed as a modifier in the polymerization at 70° C. in an autoclave as described in Example 1, and liquid elastomers were obtained at 80 percent conversion.

EXAMPLE 3

0.1 part of bromo-trichloromethane as a modifier was employed in the polymerization process at 40° C. as described in Example 1, and rubber which was soluble in benzene was obtained at 50 percent conversion. The molecular weight $M\eta$ of the rubber was 450,000.

EXAMPLE 4

A monomer mixture consisting of 90 parts chloroprene, 8 parts 1-chloro butadiene and 2 parts acrylonitrile was subjected to polymerization with 0.395 part of bromo-trichloromethane as a modifier at 50° C. as described in Example 1. The polymerization reaction was stopped by adding the short stopping agent of Example 1 when the conversion reached 70 percent. The $M\eta$ of the rubber was 350,000.

EXAMPLE 5

A monomer mixture consisting of 95 parts chloroprene, 25 parts 2,3-dichlorobutadiene and 2.5 parts acrylonitrile was subjected to polymerization with 0.395 part of bromo-trichloromethane as a modifier at a temperature of 40° C. as described in Example 1. The polymerization was stopped when the conversion reached 70 percent. The $M\eta$ of the rubber was 350,000.

EXAMPLE 6

A monomer mixture comprising 90 parts chloroprene, 5 parts acrylonitrile and 5 parts ethyl acrylate was subjected to polymerization with 0.395 part of bromo-trichloromethane at a temperature of 40° C as described in Example 1. Conversion was 70 percent, and the molecular weight of the rubber was 340,000.

EXAMPLE 7

A monomer mixture comprising 90 parts chloroprene, 5 parts acrylonitrile and 5 parts isoprene was subjected to polymerization with 0.395 part of bromotrichloromethane at a temperature of 50° C. in an autoclave as described in Example 1 . Conversion was 60% and the molecular weight ($M\eta$) was 350,000.

EXAMPLE 8

A monomer mixture comprising 90 parts chloroprene and 10 parts acrylonitrile was subjected to polymerization with 0.395 part of bromo-trichloromethane at a temperature of 50° C. as described in Example 1. Conversion was 65 percent, and the molecular weight ($M\eta$) was 330,000.

EXAMPLE 9

By using 0.425 part of dibromo-dichloromethane as a modifier, polymerization was carried out as described in Example 8. Conversion was 70 percent. The molecular weight ($M\eta$) was 320,000.

EXAMPLE 10

By using 0.470 part of 1,1,2,2-tetra bromoethane as a modifier, polymerization was carried out as described in Example 8. Conversion was 70 percent, and the molecular weight ($M\eta$) was 420,000.

EXAMPLE 11

By using 1,1,1-tribromoethane as a modifier, polymerization was carried out as in Example 8. Conversion was 65 percent and the molecular weight ($M\eta$) was 350,000.

What is claimed is:

1. A process for producing a chloroprene copolymer which comprises copolymerizing chloroprene with at least one monomer of acrylonitrile or other monomers copolymerizable with chloroprene in the presence of 0.1 to 20 percent, by weight, of a halogenated aliphatic hydrocarbon having at least one bromine bond selected from the group consisting of carbon tetrabromide, bromo-trichloromethane, bromo-trichloroethane, dibromo-dichloromethane, 1,1,1-tribromoethane and 1,1,2,2-tetrabromoethane as a modifier, and a free radical initiator.

2. The process according to claim 1, wherein said other monomer is selected from the group consisting of dienes, styrene and acrylic esters.

3. The process of claim 2, wherein said diene is selected from the group consisting of 1-chlorobutadiene, 2,3-dichlorobutadiene, butadiene and isoprene.

4. The process according to claim 2, wherein said other monomer is present in an amount of not greater than 20 percent, by weight.

5. The process according to claim 1, wherein the reaction is conducted at a temperature of from 10° to 100° C.

6. The process of claim 5, wherein said reaction temperature varies from 40° to 70° C.

* * * * *